United States Patent Office 3,206,285
Patented Sept. 14, 1965

3,206,285
CARBON BLACK PROCESS
Paul H. Johnson, Bartlesville, Okla., assignor to Phillips
Petroleum Company, a corporation of Delaware
Filed Aug. 21, 1961, Ser. No. 132,933
14 Claims. (Cl. 23—209.4)

This invention relates to the production of carbon black. In one aspect this invention relates to the production of a carbon black product having a lowered structure.

For several years carbon black has been produced in large quantities in furnaces. The larger part of the carbon black produced today is used as a reinforcing agent for rubber. By far the larger part of the compounded rubber material containing carbon black is designed specifically for tire treads or tire carcasses. The state of this rubber compounding art has advanced to such a degree that the properties of the carbon black used in such compounding must be controlled within narrow limits. Such a control of all of the desired properties of the carbon black is oftentimes difficult to achieve.

One of the most important properties of a carbon black when used in the compounding of rubber for use in tire manufacturing is commonly referred to as "structure." There is a close correlation between the structure of a carbon black and the modulus of a rubber product compounded with said carbon black. Other properties being comparable, high structure carbon blacks normally yield high modulus rubber and low structure carbon blacks normally yield low modulus rubber.

By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains. "High structure" carbon black is generally considered to have an oil absorption of about 1.35 to 1.45 cc. per gram and this is the usual range for prior art furnace blacks. "Normal structure" carbon black is generally considered to have an oil absorption of about 0.75 to 1.2 cc. per gram and in the prior art such blacks have generally been made by the channel black process. "Low structure" carbon black is generally considered to have an oil absorption of about 0.45 to 0.55 cc. per gram and in the prior art such blacks are made by the thermal process. Recently, however, furnace blacks having relatively low structure for blacks made by a furnace process have been marketed. These blacks have, in some instances, proved to be useful in applications formerly served by channel blacks, for example, in reinforcing natural rubber products and in specific applications, for example, in non-squeal soft-riding tires. These blacks are often designated "low structure" furnace blacks even though their oil absorption values fall in the range for blacks generally designated as "normal" structure or in the range between "normal" and "high" structure because their oil absorption values are lower than normal for blacks made by a furnace process.

Since it is not convenient to measure the structure directly, the oil absorption of the black is commonly used as a "measure" of the structure. It has been found that the oil absorption of a carbon black correlates closely with certain properties, such as modulus, of a rubber having the carbon black compounded therein. Measurement of oil absorption gives a quick reliable measure of the structure of the carbon black. It is thus possible to obtain a rapid measure of one of the most important properties of carbon black insofar as rubber compounds prepared with said carbon black are concerned.

It is sometimes impossible or extremely difficult to obtain precisely the desired structure on a carbon black product by controlling the furnace conditions without adversely affecting other physical properties and/or the yield of the carbon black. I have now discovered a method of controlling or adjusting the oil absorption or structure of a carbon black product produced in a furnace process which overcomes the above-described difficulties. This is accomplished by the introduction of chromium in any suitable form into the reaction zone of the carbon black producing furnace.

Thus, broadly speaking, the present invention resides in: introducing chromium into the reaction zone of a carbon black producing furnace in a small but effective amount sufficient to controllably lower the structure of the carbon black produced in said furnace; and a carbon black product containing a minor but effective amount of chromium.

An object of this invention is to provide valuable carbon blacks and methods of making the same. Another object of this invention is to provide a process for producing a furnace carbon black having a lowered structure or oil absorption value. Another object of this invention is to controllably lower the structure or oil absorption of a furnace carbon black produced by the decomposition of a hydrocarbon in a carbon black furnace. Still another object of this invention is to provide an improved feedstock for furnace carbon black processes. Another object of this invention is to provide a process for making a furnace carbon black, from a given hydrocarbon feedstock, having a lower structure than would normally be produced from said hydrocarbon feedstock. Another object of this invention is to provide additives which when blended with a conventional feedstock will enable the production of a lower structure furnace carbon black from said feedstock than would otherwise be obtained from said feedstock. Another object of this invention is to provide a process for regulating and controlling the properties of furnace carbon blacks so as to satisfy prescribed and predetermined requirements for the properties of said carbon blacks. Still another object of this invention is to provide a method for controlling and counteracting variations which exist or occur in the properties of hydrocarbons used as feedstocks in furnace carbon black processes, which variations would normally considerably modify the quality of the carbon black produced in said furnace carbon black process. Other aspects, objects and advantages of the invention will be apparent to those skilled in the art in view of this disclosure.

Thus according to the invention, there is provided a process for producing carbon black, which process comprises: partially burning a hydrocarbon feedstock in a carbon black furnace under carbon black producing conditions and in the presence of chromium; and recovering a carbon black product from the effluent from said furnace.

Further according to the invention, there is provided a carbon black product containing a small but effective amout of chromium.

Still further according to the invention, there is provided a feedstock for the production of a carbon black, comprising: a normally liquid hydrocarbon containing from 0.005 to 1.0 weight percent of chromium, the amount of said chromium present being sufficient when said feedstock is partially burned in a carbon black furnace under carbon black producing conditions to cause the production of a carbon black product having a lower structure than would be obtained in the absence of said chromium.

In the practice of the invention, the chromium additive can be obtained from any source which can be introduced into the reaction zone of the carbon black producing furnace. The only essential requirement is that said chromium additive be present in said reaction zone at the time the carbon black is formed. Thus, it is within the scope of the invention to utilize said chromium in elementary form such as the finely divided metal. It is also within the scope of the invention to utilize inorganic chromium containing compounds such as the chloride, sulfate, nitrate, carbonate, etc. The utilization of so-called organic chromium containing compounds such as metallo-organic compounds, salts of organic acids including fatty acids, chrome alkyls, etc. is also within the scope of the invention.

Thus, as used herein and in the claims, unless otherwise specified, the term "chromium" is employed generically and includes all forms of chromium, e.g., finely divided chromium metal, inorganic chromium containing compounds, and "organic" chromium containing compounds, in which the chromium additive is introduced into or is present in the reaction zone of the carbon black producing furnace.

Examples of inorganic chromium containing compounds which can be utilized in the practice of the invention include, among others, the following: chromium ammonium sulfate; chromium arsenide; chromium bromide; chromium chloride; chromium oxychloride; chromium fluoride; chromium iodide; chromium carbonate; chromium oxide; chromium nitrate; chromium sulfate; chromium sulfide chromium hydride; and the various chromium hexamine salts such as chromi-hexamine chloride, chromi-hexamine bromide, and chromi-hexamine chloride, chromi-hexamine bromide, and chromi-hexamine nitrate.

Examples of "organic" chromium containing compounds which can be utilized in the practice of the invention include, among others, the following: chromium acetate; chromium acetylacetone; chromium naphthenate; chromium oleate; chromium lanolate; and chromium resinate.

Many of the above-named and other chromium containing compounds exist in forms having water of crystallization associated therewith. Such compounds can be used with or without the associated water of crystallization. Also, many chromium containing compounds exist in forms wherein the chromium has a different valence, i.e., (ic) or (ous) forms; each can be utilized in the practice of the invention.

The amount of the chromium additive introduced into the reaction zone of the carbon black producing furnace can vary within rather wide limits depending upon the exact nature of the carbon black forming reaction being utilized, the properties of the hydrocarbon feedstock being utilized, and the desired amount of lowering or regulation of the structure or oil absorption of the carbon black product. In all instances, the amount of the chromium additive utilized will be a small but effective amount sufficient to effect the desired lowering or control of the carbon black structure or oil absorption. In general, the amount of the chromium additive utilized will be within the range of from 0.005 to 1.0 weight percent chromium based on the hydrocarbon charged to the carbon black producing furnace.

Figure 1:
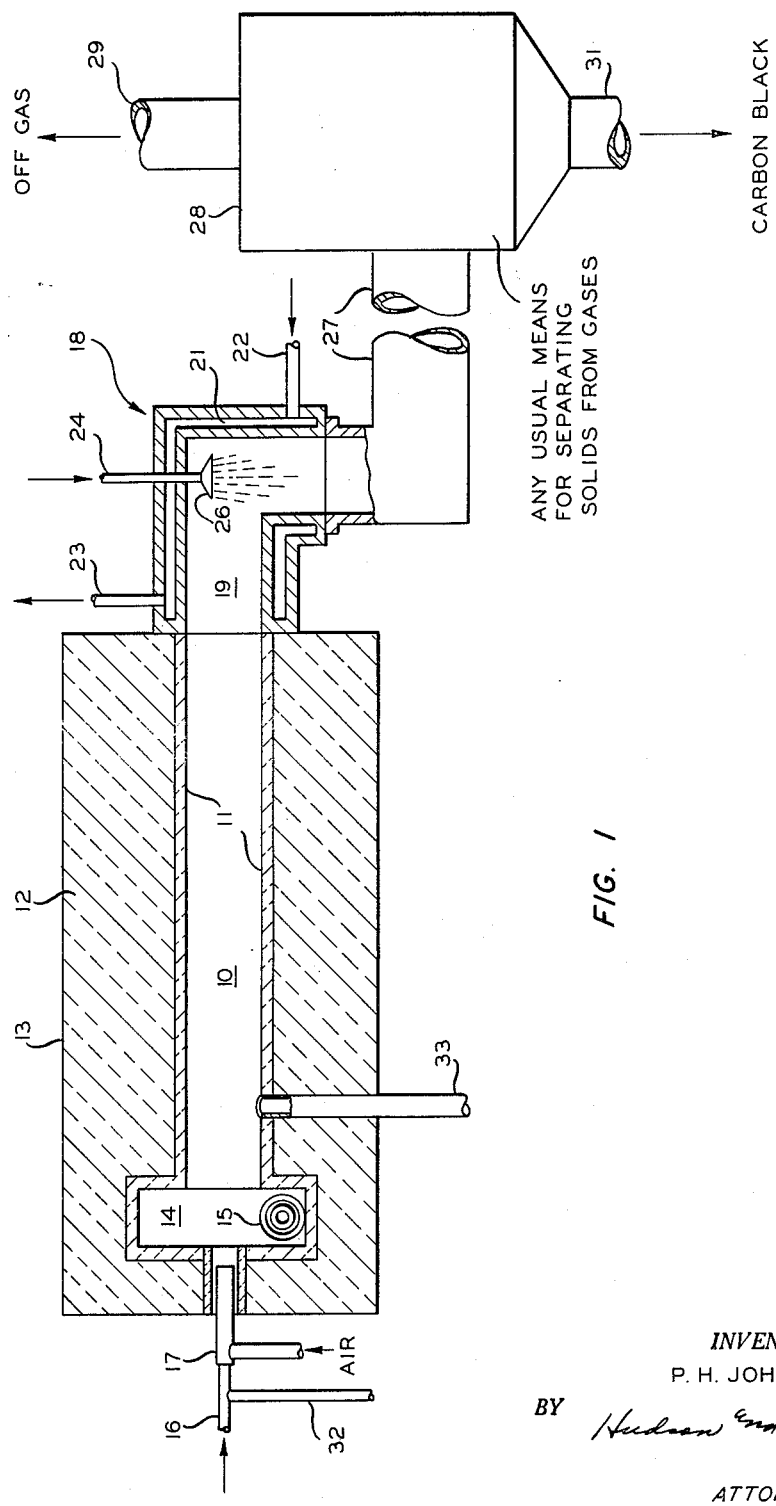
FIGURE 1 illustrates one form of apparatus which can be employed in the practice of the invention.

The invention is not limited to employing any particular type of carbon black furnace and/or apparatus for carrying out the method of the invention. FIGURE 1 illustrates in diagrammatic form the general construction and the general shape of one presently preferred type of carbon black furnace, and associated apparatus, which can be employed in the practice of the invention. Referring now to said FIGURE 1, a reaction chamber or section 10 has a refractory lining 11 made of a highly refractory material such as sillimanite, alumina, or other refractory material suitable for the purpose. A steel shell 13 containing insulating material 12 surrounds said refractory liner. At the inlet end of the furnace there is a short section 14 having a diameter somewhat larger than the diameter of reaction section 10. This larger diameter section 14 is essentially a combustion chamber in which a combustible mixture of a gas, such as natural gas, and an oxygen containing gas, such as air, is burned. Said combustible mixture is injected into said combustion chamber 14 through an inlet tube 15 which is so positioned that the gases enter said combustion chamber in a direction tangent to the cylindrical wall thereof. Upon continued injection of the combustible mixture, the flame and combustion products follow a spiral path toward the axis of the combustion chamber. When the spiral becomes less than the diameter of reaction section 10, the gaseous flow changes from a spiral to a helix, and following this latter pattern the gases remain adjacent the wall of reaction section 10 and finally pass into the jacketed cooler section 18 at the end of said reaction section.

Reactant hydrocarbon gas or oil, from a source not shown, passes through a preheater, also not shown, and finally passes through feed conduit 16 which is arranged axially so that feed introduced therethrough will pass axially through the furnace. Surrounding said feed conduit 16 is a larger conduit 17, called an "air jacket." The arrangement of said two conduits 16 and 17 defines an annular space through which it is intended to pass air into the furnace. Air passing through said annular space is intended to keep the inner end of the feed conduit 16 cool to prevent the deposition of carbon thereon.

At the downstream end of the furnace is an effluent cooling section 18. The conduit 19 carrying furnace effluent is surrounded by a water jacket 21 having an inlet connection 22 and an outlet connection 23 for the passage of water. A conduit 24 conducts water, from a source not shown, to a spray nozzle 26 disposed inside conduit 19 for cooling or quenching of the furnace effluent gases. The water jacket assembly is, of course, provided to prevent overheating of conduit 19. To the downstream end of jacketed conduit section 18 there is attached another conduit 27. Said conduit 27 serves as an air cooler and its length is dependent on the amount or degree of further cooling of the furnace effluent desired. Gases containing carbon black suspended therein pass from said conduit 27 into carbon black separating means 28 which can be any usual form of apparatus for separating solids such as carbon black from gases. Gases from which the carbon black has been removed issue from said separator through conduit 29 and carbon black product passes through outlet conduit 31 to such disposal or further treatment as desired.

The furnace and apparatus just described have the general conformity and are constructed in the manner fully described in U.S. Patent 2,564,700. Various modifications of said furnace which can also be employed in the practice of the invention are also described in said patent. Other types of furnaces and apparatus which can also be employed in the practice of the invention are described in other patents mentioned in said Patent 2,564,700.

In the specific examples given hereinafter, the carbon black producing runs were carried out in a pilot plant size furnace essentially like that illustrated in the drawing and having a reaction chamber 10 which was 3 inches in internal diameter and 25 inches in length. The combustion chamber 14 was 11 inches in diameter and 4 inches long. These dimensions are given merely as examples, and any or all dimensions may be varied as desired. In modifying the furnace design it is necessary, however, to make certain that the combustion chamber has a relatively large diameter in comparison to its length, while the reverse is true for the reaction chamber.

In the practice of the invention, the additive or carbon black structure depressant, chromium, can be introduced into the reaction zone of the furnace along with the hydrocarbon feed, with the tangential fuel mixture, or directly into the reaction section of the furnace. Said depressant or additive is effective in any form and can be introduced at said locations in any suitable form, e.g., in solid, liquid, or vapor form. The only requirement is that it be present in the reaction zone at the time the carbon black is formed.

When said additive is utilized in the form of a solid such as a powdered chromium containing compound, or as the finely divided metal, it can be uniformly dispersed or suspended directly into the hydrocarbon feed in suitable mixing apparatus not shown and the resulting dispersion or suspension then introduced into reaction section 10 through feed conduit 16. Said finely divided solid can also be dispersed or suspended in a carrier which can then be uniformly dispersed in the hydrocarbon feed by introduction through conduit 32 into feed conduit 16.

If the chromium containing compound is directly soluble in a liquid reactant hydrocarbon feedstock, it can be dissolved directly in said feedstock and introduced into reaction section 10 through conduit 16. Said chromium containing compound can also be dissolved in a suitable solvent to form a solution which is then either mixed with the reactant hydrocarbon feedstock in suitable mixing apparatus, not shown, or introduced through conduit 32 into feed conduit 16 for mixing with said feedstock and introduction into reaction section 10. Many chromium containing compounds are soluble in organic solvents such as alcohols, ethers, acetone, etc. Any suitable solvent can be used for this purpose. Aqueous solutions of water soluble chromium containing compounds can also be used in the same manner. Said aqueous solutions can be introduced through conduit 32 or can be emulsified with the hydrocarbon feedstock prior to its introduction through conduit 16. It will be understood that any of the various described forms of the chromium additive can also be introduced via conduit 33 directly into reaction section 10. Since it is essential that the chromium additive be present at the time the carbon black is formed, it is necessary that when it is introduced directly into combustion chamber 10 it be introduced into said chamber in the upstream one-third thereof, preferably immediately after the inlet to said chamber 10.

Since the chromium additive or structure depressant is normally used in relatively low concentrations, it is usually advantageous to introduce same in as highly diluted or extended form as practical so as to facilitate maintaining a uniform addition rate and level of concentration. Thus, it is preferred to introduce said additive or depressant in the form of dilute aqueous solutions or similarly dilute organic solutions, or in the form of organic or aqueous emulsions which can be uniformly dispersed in the hydrocarbon feed. Although not specifically discussed in the preceding paragraph, it is within the scope of the invention to introduce the chromium additive as a vapor at any of the above-described introduction points. Any suitable means can be employed for vaporizing the chromium containing compound. The most preferred sources of the chromium additive are the water soluble compounds, or compounds which are soluble in an organic solvent or are directly soluble in the hydrocarbon feedstock.

The following examples will serve to further illustrate the invention.

EXAMPLE I

A run was made in which a preheated aromatic concentrate oil having 0.07 weight percent of chromic chloride ($CrCl_3 \cdot 6H_2O$) uniformly dispersed therein was introduced axially into a carbon black furnace essentially of the same type as that illustrated in the drawing and having the dimensions set forth above. Said chromium compound was uniformly dispersed in said oil as an aqueous solution immediately prior to the injection of said oil into the furnace. Said aromatic concentrate oil was burned in the presence of said chromic chloride under carbon black producing conditions to produce a carbon black product. Said carbon black product was separated from the effluent gases in conventional manner and tested. The operating conditions, yield, and tests on the carbon black are set forth in Table I below as Run No. 1.

Another run was made under identical conditions, employing the same furnace, except that the aromatic oil concentrate feed did not contain the added chromium compound. The results of this run are set forth in Table I below as Run No. 2.

*Table I*

|  | Run No. 1 | Run No. 2 |
|---|---|---|
| Additive concentration, wt. percent | 0.07 | 0.0 |
| Furnace Operating Conditions: |  |  |
| Oil feed rate, gal./hr | 6.29 | 6.20 |
| Oil preheat temp., °F | 550 | 550 |
| Tangential air rate, M c.f.h | 6.0 | 6.0 |
| Tangential gas rate, M c.f.h | 0.4 | 0.4 |
| Jacket air rate, M c.f.h | 0.2 | 0.2 |
| Reaction section— |  |  |
| Length, inches | 25 | 25 |
| Combustion section— |  |  |
| Length, inches | 4 | 4 |
| Diameter, inches | 11 | 11 |
| Carbon Black Product: |  |  |
| Yield, lb./gal | 3.00 | 2.80 |
| Photelometer | 92 | 91 |
| $N_2$ Surface area, m.$^2$/g | 131.0 | 135.3 |
| Oil absorption, cc./g | 1.28 | 1.45 |
| Chromium, wt. percent (approx.) | 0.03 | ---------- |

From the data given above, it is seen that the addition of a very low concentration of a chromium containing compound to the reaction zone of a carbon black producing furnace will lower the oil absorption and related structure of the carbon black product without adversely affecting the yield and other important properties to any significant degree. The invention thus provides a method which will permit adjustment of the structure of the carbon black product without significantly altering its other properties. The method of the invention is particularly valuable for counteracting variations in the feedstock which would cause undesired variations in the structure of the carbon black product. For example, in many plants liquid hydrocarbon feedstocks are normally charged from a storage tank until said storage tank is about empty. The charge is then switched to another storage tank containing oil which, although it may be from the same source as the oil in the first tank, may vary enough in its properties (aromaticity, for example) to affect the structure of the carbon black product. This, of course, could be known beforehand by making pilot plant tests on the charge stocks. For example, if one were engaged in a long operating run to produce a large quantity of a carbon black product having narrow specification requirements with respect to structure, and it was necessary to change feedstocks during said run to a new feedstock which would ordinarily give a higher structure carbon black, then one could use the method of this invention to adjust the structure of the carbon black product from said new feedstock to be essentially the same as the carbon black product from the former feedstock.

EXAMPLE II

Four samples of each of the carbon black products form Run No. 1 and Run No. 2 of the above Example I were compounded with natural rubber according to ASTM D-1419-58T to produce a series of four rubber compositions containing Run No. 1 carbon black product, and a series of four rubber compositions containing Run No. 2 carbon black product. The compounding recipe employed in preparing said rubber compositions was as follows:

| | Parts by weight |
|---|---|
| Smoked sheet | 100 |
| Carbon black | 40 |
| Stearic acid | 3 |
| Zinc oxide | 5 |
| Altax [1] | 0.6 |
| Sulfur | 2.5 |

[1] Benzothiazyl disulfide.

Said rubber compositions were each cured to a finished rubber by curing at 293° F. as follows: one composition from each series cured for 10 minutes, a second sample from each series cured for 20 minutes, a third sample from each series cured for 30 minutes, and a fourth sample from each series cured for 40 minutes.

Figure 2:
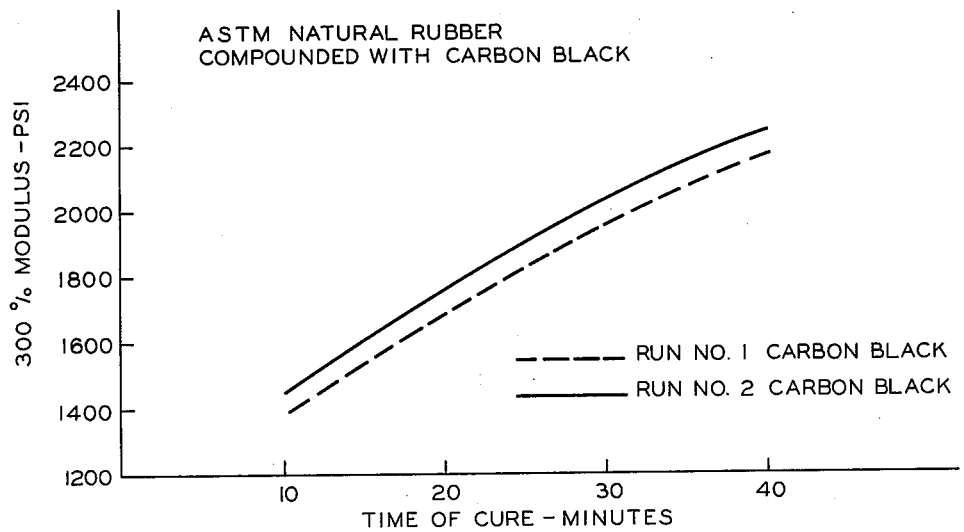
FIGURES 2 and 3 are graphs comparing the modulus values of a series of rubber samples compounded with a conventional furnace process carbon black with the modulus values of another series of samples of said rubber compounded with a furnace process carbon black produced in accordance with the invention.
Figure 3:
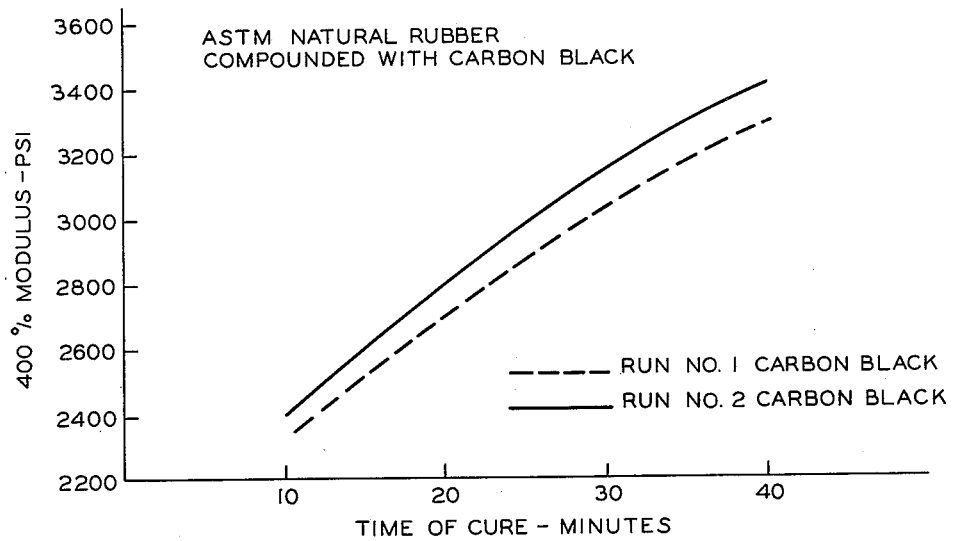

Portions of each of the thus prepared finished rubber products were then tested for 300% modulus and 400% modulus in accordance with ASTM D–412–51T. A comparison of the 300% modulus values is given in FIGURE 2 and a comparison of the 400% modulus values is given in FIGURE 3. Said FIGURES 2 and 3 each show that lower structure (oil absorption) carbon black product of Run No. 1 produced a lower modulus rubber throughout the range of curing times tested.

The aromatic concentrate oil used in the runs of the above example was a conventional commercial carbon black feedstock which had been prepared in known manner by liquid sulfur dioxide extraction of cycle oils obtained in the catalytic cracking of gas oils. Said oil had the following properties:

| | |
|---|---|
| API gravity | 11.0 |
| Vacuum distillation, ° F. at 760 mm.: | |
| First drop | 470 |
| 5 | 558 |
| 10 | 587 |
| 20 | 611 |
| 30 | 639 |
| 40 | 660 |
| 50 | 681 |
| 60 | 711 |
| 70 | 761 |
| 80 | 820 |
| 90 | 867 (82%) |
| Bureau of Mines correlation index | 90.4 |
| Viscosity: | |
| SUS at 100° F. | 81.9 |
| SUS at 210° F. | 37.6 |
| Carbon, wt. percent | 88.8 |
| Hydrogen, wt. percent | 9.5 |
| Sulfur, wt. percent | 1.29 |
| Ramsbottom carbon residue, wt. percent | 1.61 |
| BS & W, vol. percent | 0.17 |
| Pentane insoluble, wt. percent | 0.44 |
| Pour point, ° F. | 45 |
| Aniline point, ° F. | 93.6 |
| Refractive index, 20/D | 1.5854 |

The above-described aromatic concentrate oil of Example I represents one presently preferred feedstock for use in the practice of the invention. However, conventional aromatic oils used in the production of furnace carbon blacks can include oils other than extract oils produced by liquid sulfur dioxide extraction of cycle oils. Typical properties of conventional aromatic oils are: boiling range 400–1000° F., BMCI 75 to 130, and an API gravity of from about 0 to about 20°.

The invention is not to be limited to the use of such aromatic concentrate oils. Other oils, such as kerosene, gasoline boiling range hydrocarbons, heavy or light naphthas or oils even heavier than recycle gas oils can be used. Such hydrocarbon materials as natural gas, either dry gas, wet or raw natural gas as it comes from a gas well, or gasoline extraction plant or refinery residue gas can be used. Further, hydrocarbons heavier than said gases can be used as charge, such as butane, pentane or the like. Broadly, most any hydrocarbon can be used as feed in my process. The feed can be injected as a liquid through a spray or atomizer, although I prefer to operate with the feed injected as a vapor. Hydrocarbons from other sources than petroleum likewise are suitable, as for example, low temperature coal gas, coal tar distillates, shale gases and distillates can be used. These charge stocks may contain most any class of hydrocarbon compound, as for example, saturated or unsaturated hydrocarbons, paraffins, olefins, aromatics, naphthenes or any others which might become available.

While it is not intended to limit the invention to any theory of operation, it is presently believed that the depressing effect of the chromium additive on the carbon black structure is due to some modification of the carbon black forming reaction itself which results in the chromium additive being retained in or on the carbon black product. It has been noted that said chromium additive or depressant must be present during the carbon black forming reaction. Introduction of said additive at the downstream end of the reaction zone results in little, if any, effect on the structure of the carbon black product. It is presently believed that the action of the chromium additive is due, in some way not presently known to the presence of chromium ions in the reaction section of the furnace during the formation of the carbon black. It has been noted that the nature of the anionic portion, in the case of inorganic chromium containing compounds, or of the organic portion, in the case of organic chromium containing compounds, is of secondary importance. Thus, the chromium itself, in some active form during the formation of the carbon black product, appears to be the active depressant of the invention.

Analyses have shown in carbon black producing runs wherein a metal containing compound is included in the hydrocarbon feedstock that from 75 to 100 percent of the metal (calculated as the metal) is retained in or on the carbon black product. Just what form, e.g., oxide or other, said retained metal is in, or just how it is associated with the carbon black particles themselves, is not presently known. It is clear however that the metal, in some form and some manner of association, is present in the carbon black product in small but effective amounts sufficient to appreciably lower the structure of said carbon black product. The amount said structure is lowered will depend upon the amount of metal or metal containing compound present in the carbon black forming zone and the nature of the hydrocarbon feedstock.

The BMCI correlation index referred to is a correlation index developed by the Bureau of Mines and is employed to denote aromaticity of an oil; a higher numerical index denoting a more aromatic oil. The index is calculated from the formula $$C.I. = \frac{48640}{K} + 473.7G - 456.8$$

where:

C.I.=Bureau of Mines correlation index
$K$=average boiling point (° K.)
$G$=specific gravity @ 60° F./60° F.

Oil absorption is measured by adding oil a few drops at a time to a one gram sample of carbon black on a mixing stone or glass plate. After each addition the oil is incorporated throughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black, or converted to gallons of oil per 100 pounds of black.

The photelometer test is employed to indicate the quality of carbon blacks. In such a test, two grams of the black is slurried with 50 milliliters of a colorless solvent such as chloroform, toluene, benzene, acetone, xylene or carbon tetrachloride. The slurry is heated to the boiling point in one to two minutes and then filtered. The filtrate is cooled and placed in the photelometer cell. Radiation is passed through the cell and the transmission is measured. The percent transmission is referred to as the "photelometer reading," and serves to indicate the tarry residue present in the carbon black. Methods of controlling the quality of furnace blacks employing said photelometer tests are set forth in Patent 2,892,684.

While I have given as illustrative embodiments some examples using the helical flame furnaces which are shown in prior patents cited above, my invention is not limited thereto but is clearly applicable to other furnace carbon black processes, such as those set forth in Ayers Re. 22,886 of June 3, 1947; Hanson, 2,368,828, of February 6, 1945; Miller, 1,807,321, of May 26, 1931; Wiegand, 2,378,055, of June 12, 1945; and 2,440,424 of April 27, 1948, and numerous other furnace processes.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. In the process for producing furnace carbon black by the decomposition of a normally liquid hydrocarbon feedstock wherein said hydrocarbon feedstock is injected into a carbon black furnace having a combustion zone and a reaction zone, and is therein, at least in part, partially burned under carbon black producing conditions to form carbon black in gaseous suspension and said carbon black is thereafter separated from the resultant furnace effluent gases and collected, and by which process a furnace carbon black of relatively high structure is normally produced, the method of reducing the structure characteristics of the carbon black so produced, which method comprises: introducing into a zone of said furnace, not further downstream than the zone thereof in which said burning of said hydrocarbon to carbon black occurs, a chromium additive effective under said furnace conditions to depress the extent of structure development in the carbon black produced, said chromium additive being in addition to any naturally occurring chromium which may be present in said feedstock; and proportioning said additive, relative to said hydrocarbon feedstock to obtain the required reduction in structure.

2. The method of claim 1 wherein said chromium is introduced into said furnace by being dispersed in said feedstock prior to the introduction of said feedstock into said furnace.

3. The method of claim 2 wherein said chromium is in the form of the finely divided metal.

4. The method of claim 2 wherein said chromium is in the form of an organic chromium containing compound.

5. The method of claim 2 wherein said chromium is in the form of an inorganic chromium containing compound.

6. The method of claim 5 wherein said inorganic chromium containing compound is chromium chloride.

7. The method of claim 1 wherein said chromium is introduced directly into said reaction section of said furnace.

8. The method of claim 1 wherein said chromium is introduced into said furnace in an amount within the range of from 0.005 to 1.0 weight percent chromium, based on said hydrocarbon feedstock.

9. A process for producing furnace carbon black, which process comprises: introducing a normally liquid aromatic concentrate oil feedstock containing from 0.005 to 1.0 weight percent of a chromium additive into a carbon black producing furnace, said chromium additive being in addition to any naturally occurring chromium which may be present in said feedstock; partially burning said feedstock under carbon black producing conditions in said furnace in the presence of said chromium; and recovering from the effluent from said furnace a carbon black product having a lower structure than would normally be produced from said feedstock.

10. A process for producing furnace carbon black, which process comprises: partially burning a normally liquid hydrocarbon feedstock in a carbon black furnace under carbon black producing conditions; introducing into a zone of said furnace, not further downstream than the zone thereof in which said burning occurs, a chromium additive effective under said furnace conditions to depress the extent of structure development in the carbon black produced, said chromium additive being in addition to any naturally occurring chromium which may be present in said feedstock and being present in a small but effective amount sufficient to lower the structure characteristics of said carbon black; and recovering said carbon black from the effluent from said furnace.

11. A process for producing furnace carbon black, which process comprises: introducing a normally liquid hydrocarbon feedstock into a carbon black producing furnace; introducing a chromium additive into said furnace, said chromium additive being in addition to any naturally occurring chromium which may be present in said feedstock and being introduced in a small but effective amount sufficient to lower the structure characteristics of said carbon black; partially burning said hydrocarbon feedstock under carbon black producing conditions in said furnace in the presence of said chromium; and recovering a furnace carbon black product containing chromium from the effluent from said furnace.

12. A process according to claim 10 wherein said chromium is metallic chromium, is finely divided in form, and is introduced into said furnace in suspension in said hydrocarbon.

13. A process according to claim 10 wherein said chromium is introduced into said furnace as an inorganic chromium containing compound in suspension in said hydrocarbon.

14. A process according to claim 10 wherein said chromium is introduced into said furnace as an organic chromium containing compound in suspension in said hydrocarbon.

References Cited by the Examiner

UNITED STATES PATENTS

| | | | |
|---|---|---|---|
| 1,609,120 | 11/26 | Lamb | 106—307 |
| 2,356,471 | 8/44 | Rehner | 23—209.8 |
| 2,560,368 | 7/51 | Richards et al. | 44—67 |
| 2,564,700 | 8/51 | Krejci | 23—209.4 |
| 2,632,713 | 3/53 | Krejci | 106—307 |
| 2,684,894 | 7/54 | Trexel | 44—67 |
| 2,914,418 | 11/59 | Eastman | 106—307 |
| 3,010,794 | 11/61 | Friauf et al. | 23—209.4 |
| 3,010,795 | 11/61 | Friauf et al. | 23—209.4 |

FOREIGN PATENTS 361,837    11/31    Great Britain.

MAURICE A. BRINDISI, *Primary Examiner.*